G. KOWALSKY.
FEED BAG.
APPLICATION FILED OCT. 18, 1911.
1,016,075.
Patented Jan. 30, 1912.
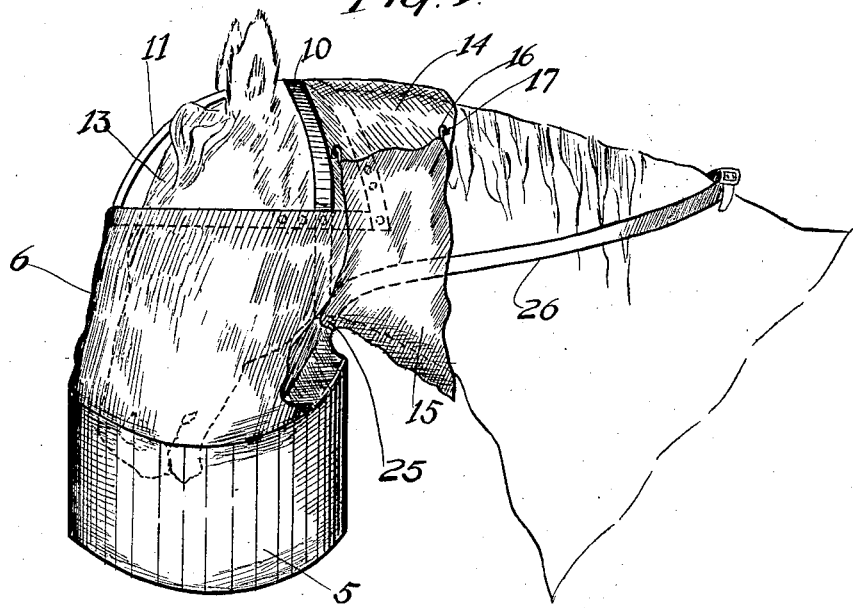
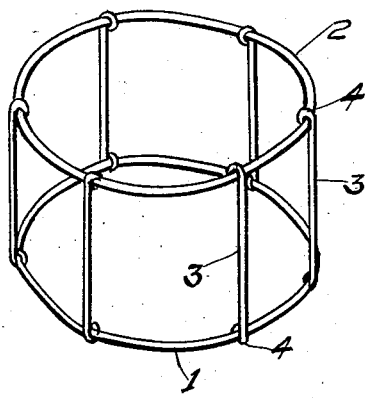
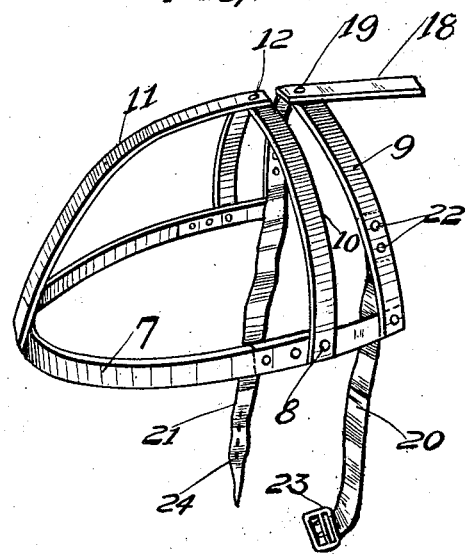
WITNESSES:
Erich Burkly
Samuel Payne
INVENTOR.
GEO. KOWALSKY
BY
H. C. Everett Co
ATTORNEYS.

UNITED STATES PATENT OFFICE.

GEORGE KOWALSKY, OF McDOWELL, WEST VIRGINIA.

FEED-BAG.

1,016,075.  Specification of Letters Patent.  Patented Jan. 30, 1912.

Application filed October 18, 1911. Serial No. 655,283.

*To all whom it may concern:*

Be it known that I, GEORGE KOWALSKY, a subject of the Emperor of Austria-Hungary, residing at McDowell, in the county of McDowell and State of West Virginia, have invented certain new and useful Improvements in Feed-Bags, of which the following is a specification, reference being had therein to the accompanying drawing.

This invention relates to feed bags, and the object of my invention is to furnish a feed bag with a hood that will prevent a horse or other animal from spilling the feed within the bag during a movement of the head, the hood being constructed whereby plenty of air will be admitted to the bag, furthermore, whereby the horse or animal cannot observe approaching automobiles, other vehicles or objects that would tend to scare the horse or other animal.

The feed bag has been especially designed for horses that are ordinarily left standing upon the street at feeding time, the bridle being removed and the horse left untied. Many accidents and runaways occur by the horse being scared by approaching vehicles or objects. To prevent such accidents my feed bag is constructed with a hood that serves functionally as a blind for the horse, consequently the animal cannot observe approaching vehicles or objects.

The invention will be hereinafter specifically described and then claimed, and reference will now be had to the drawing, wherein:—

Figure 1 is a side elevation of a bag in accordance with this invention, Fig. 2 is a perspective view of a detached frame of the bag, and Fig. 3 is a perspective view of a detached harness for the bag.

A feed bag in accordance with this invention comprises a cylindrical wire frame having a bottom ring 1 and a top ring 2, said rings being connected by a plurality of equally spaced vertical rods 3 having the ends thereof provided with eyes 4 adapted to receive the rings 1 and 2. The frame is covered by a suitable piece of fabric to provide a receptacle 5 and the fabric is carried beyond the upper edges of the receptacle to form a hood 6. Suitably connected to the upper edges of the hood 6 is a U-shaped band 7 and riveted or otherwise connected, as at 8 to the ends of said band are the ends of neck straps 9 and 10, the latter being connected to the band 7 by a head strap 11, said head strap having the ends thereof riveted or otherwise connected, as at 12 to the strap 10 and the band 7, intermediate the ends thereof. The hood 6 is shaped to surround the nose of a horse's head 13, said hood extending above the eyes of the head. The hood extends under the throat of the horse and is provided with a neck piece 14 and a throat piece 15, the latter being connected to the former through the medium of hooks 16 and eyes 17 of a conventional form. To maintain the neck piece 14 in an extended position, the neck strap 9 is provided with a rearwardly extending strap 18, which has one end thereof riveted or otherwise connected, as at 19 to the strap 9, intermediate the ends thereof. The neck strap 9 is provided with elastic throat straps 20 and 21, said straps having the ends thereof riveted or otherwise connected, as at 22 to the inner side of the neck strap 9. The throat strap 20 is provided with a buckle 23 and the end of the throat strap 21 has openings 24, whereby it can be connected to the buckle 23. Suitably connected to the hood 6, as at 25 is a check rein 26, said rein extending outwardly along the neck of the horse, under the neck and throat pieces 14 and 15. The check rein 26 permits of the horse's head being elevated and held in an elevated position, whereby the horse cannot swing the head downwardly to the ground and rub the receptacle 5 upon the ground, thereby preventing the receptacle from being unduly worn.

The frame of the feed bag is preferably made of light and durable wire, the harness for the hood of light and durable leather, and the fabric of the receptacle 5, hood 6 and pieces 14 and 15 of light and durable canvas.

What I claim is:—

A feed bag comprising a cylindrical wire frame, a piece of fabric mounted upon said frame and providing a receptacle, said fabric extending above said frame to provide a hood having a neck piece and a throat piece adapted to be connected around the neck of a horse, a harness carried by the upper edges of said hood and including an elastic throat strap, and a check rein connected to said hood.

In testimony whereof I affix my signature in the presence of two witnesses.

GEORGE KOWALSKY.

Witnesses:
 A. M. SHELTON,
 C. P. SHELTON.

Copies of this patent may be obtained for five cents each, by addressing the "Commissioner of Patents, Washington, D. C."